United States Patent Office 3,775,512
Patented Nov. 27, 1973

3,775,512
POLYMER CROSS-LINKING USING SYSTEM CONTAINING N-METHYLOL AMIDE GROUPS AND AN ACIDIC SULFAMATE COMPOUND
Raymond Lanthier, Pierrefonds, Quebec, Canada, assignor to Gulf Oil Canada Limited, Toronto, Ontario, Canada
No Drawing. Filed Jan. 21, 1972, Ser. No. 219,826
Int. Cl. C08g 9/20
U.S. Cl. 260—851  11 Claims

ABSTRACT OF THE DISCLOSURE

Cross-linking of polymer is disclosed using a cross-linkable system containing N-methylolamide groups and as catalyst at acidic pH a water-soluble compound containing a sulfamate group.

This invention relates to formation of cross-linked polymer film and more particularly to a catalyst for the cross-linking of polymer systems containing a specific type of reactive chemical group.

Many systems for polymer cross-linking have been proposed in the art, cross-linking of polymer during drying of wet films thereof providing polymer with improved properties for coating applications. When the polymer is prepared in the form of an aqueous emulsion and a film is cast therefrom, as drying of the film progresses certain chemical groups incorporated in the polymer, for example N-methylolamide groups, can react to form cross-links. Generally, the cross-linking reaction requires the action of heat and/or acid catalyst, these expedients for promoting cross-linking being well-known in the art. Examples of generally suggested cross-linking catalysts are sulfuric, hydrochloric, and phosphoric acids, the organic acids n-butyl phosphoric, p-toluene sulfonic, and trichloroacetic, and acid salts, e.g. chromic and zinc nitrates, ammonium chloride, and acid phosphates. For practical applications of polymer cross-linking systems, it is often not feasible to use strongly acidic conditions because of the nature of the substrate to which the film or coating is to be applied and sometimes because of the nature of the polymer itself. Furthermore, in some coating applications the use of heat for film drying and cross-linking is not desirable. Thus a system which cross-links efficiently in a relatively short period of time under mild pH conditions but without the use of heat is particularly advantageous.

The present invention provides a process for polymer cross-linking utilizing a novel catalyst and cross-linkable systems containing N-methylolamide groups. With certain specific systems far more efficient cross-linking can be achieved using this novel catalyst under mild pH conditions without the use of heat than can be obtained with prior art catalysts under similar conditions.

The cross-linkable systems to which the present process is applicable may comprise a polymer containing reactive groups or, as separate components, the aforesaid polymer and a cross-linking agent, i.e. a non-polymeric compound containing chemical groups which under appropriate conditions will react with chemical groups incorporated in the polymer. The cross-linkable system must however contain N-methylolamide groups to be effectively cross-linked according to the present invention.

The invention thus consists of a process for preparing a cross-linked polymer film from an aqueous polymer emulsion containing a cross-linkable system incorporating N-methylolamide groups, the components of the system comprising the polymer which is film-forming at ambient room temperature and optionally a cross-linking agent, the process comprising adding to the emulsion a water-soluble compound containing a sulfamate group as cross-linking catalyst, the emulsion being adjusted to acidic pH with a member of the group of sulfamic acid and nitric acid, casting a film from the emulsion, and drying the film.

As the polymer is to be applied from aqueous emulsion it must form continuous film at ambient room temperature. Thus the polymer must be prepared from monomers or combinations thereof which will give either a polymer of relatively low glass transition temperature ($T_g$) or a polymer which can be rendered film-forming at ambient room temperature by addition of plasticizer as known in the art. Suitable monomers to form the basis of polymers to be cross-linked according to the present invention are, for instance, vinyl esters of monocarboxylic acids for example vinyl acetate, alkyl esters of acrylic and methacrylic acids for example ethyl acrylate and n-butyl acrylate, and vinyl chloride. These can be used individually or in mixtures with each other or with still other unsaturated monomers, for example ethylene which is particularly advantageous in lowering the $T_g$ of for instance vinyl chloride polymer. The preferred of these monomers however is vinyl acetate.

If no cross-linking agent is to be used, the polymer itself must of course contain the N-methylolamide groups for cross-linking. If a cross-linking agent is to be employed, both it and the polymer may contain the required N-methylolamide groups or only one component may contain these groups, in which case the other component must contain chemical groups which can react therewith, preferably amide groups. Thus the aforementioned monomers which form the basis of polymers to be cross-linked according to the present invention must be copolymerizable preferably with unsaturated amide monomers or N-methylol derivatives thereof. The preferred polymer is a copolymer of vinyl acetate with acrylamide. The proportion of unsaturated amide for example acrylamide incorporated in the polymer is preferably 2% to about 12% by weight of polymer; higher proportions tend to impart water sensitivity to polymer film even after cross-linking has been effected, but such higher proportions can be used if desired.

The preparation of polymer emulsions suitable for the purposes of the present invention is conventional and can be carried out using batch or continuous emulsion polymerization processes known in the art and as disclosed for instance in U.S. Pats. 3,365,409 and 3,551,396.

When the emulsion contains a polymer having unsubstituted amide groups, for instance a vinyl acetate/acrylamide copolymer, at least some of the amide groups when so desired can readily be converted to N-methylolamide groups, as known in the art, by addition of formaldehyde in stoichiometric proportion or less to the emulsion and adjustment of the pH of the emulsion to about 7. pH adjustment is suitably carried out by addition of sodium silicate, a tertiary amine for example triethylamine or triethanolamine, trisodium phosphate or similar compound. Strongly basic compounds are not suitable, as polymer coagulation occurs if localized pH is too high during addition of the base. Ammonia is not particularly suitable as it reacts with formaldehyde. Sodium silicate is the most preferred compound for this purpose. For the formation of the N-methylolamide groups, formaldehyde-yielding compounds may be used instead of formaldehyde under appropriate conditions.

As indicated hereinbefore the system to be cross-linked according to the present invention may include a cross-linking agent to promote higher density of cross-linking. As also indicated, this compound may itself contain N-methylolamide groups or chemical groups reactive therewith, preferably amide groups. Such compounds should either be water-soluble or compatible with the polymer phase, and can be added directly to the polymer emulsion prior to addition of the cross-linking catalyst thereto and casting of film from the emulsion. Examples of suitable cross-linking agents which are known in the art are tetramethylol acetylenediurea, dimethylolurea, dimethylol ethyleneurea, or the corresponding non-methylolated compounds. The proportions of cross-linking agents to be used will depend on the desired characteristics of the final polymer film and may be varied widely i.e. from a few percent to as high as 50% by weight of emulsion solids.

The manner in which the polymer emulsion is to be applied will determine the manner of addition of the cross-linking catalyst according to the present invention. If low pH conditions are not detrimental, one need only add to the emulsion, just prior to use, sulfamic acid in sufficient quantity to give an emulsion pH of about 1.5 or 2. The emulsion is then cast as a film or applied to a particular substrate and on drying the film at ambient room temperature polymer cross-linking occurs within a few days. Alternatively of course cross-linking can quickly be obtained, i.e. in a matter of minutes, by the application of heat if feasible. If low pH conditions, e.g. pH 1.5–2, are not suitable, a water-soluble salt of sulfamic acid is added to the emulsion and the pH then adjusted to about 5 with either sulfamic acid or nitric acid. This procedure may also be followed for low pH conditions merely by adjusting the pH to the lower value with the sulfamic or nitric acid. The water-soluble salts of sulfamic acid include the ammonium, alkali metal, and alkaline earth metal sulfamates but of these ammonium sulfamate is preferred. The amount of water-soluble sulfamate required for promotion of cross-linking is small, preferably about 0.3 to 0.5% by weight of emulsion solids. Crystallization of the salt tends to occur if greater proportions are used, although if the polymer film cast from the emulsion is cured at elevated temperature the crystals tend to dissolve at the higher temperatures and perhaps afford an even higher density of cross-linking. Lesser proportions tend to provide lower cross-linking density in the dried film. The preferred quantity of cross-linking catalyst required, however, does not depend to any great extent on the number of cross-linkable chemical groups incorporated in the polymer, as even if the number is greatly increased the aforementioned proportions of catalyst are sufficient for good cross-linking.

The following examples are illustrative of the present invention but are not to be taken as limiting to the scope thereof.

In the examples to follow cross-linking in dried polymer film has been determined by a modification of the "Solubility Test" described in Canadian Pat. 863,406 of R. Lanthier. This test is a measure of the percent of polymer sample which is insoluble in a specific solvent system, which solvent system however completely dissolves non-cross-linked polymers of the type illustrated. The test is carried out on dried polymer film by mixing one gram of polymer film, accurately weighed and cut into small pieces, with 40.0 ml. acetone-water solvent (90:10 by weight). The mixture is agitated at ambient room temperature for a period of 16 hours and then centrifuged for 15 minutes at 2200 r.p.m. 10 ml. of clear supernatent liquid from the centrifuged mixture is then pipetted into a previously weighed aluminum dish. The liquid is evaporated under an infrared lamp, and in the final stage, under vacuum (20 mm. Hg) at 80° C. to dryness. The dish is reweighed giving the amount of polymer dissolved in the 10 ml. of solvent. The amount of insoluble polymer in the original film sample is then readily calculated.

EXAMPLE 1

The emulsion used was a vinyl acetate/acrylamide copolymer emulsion containing 7.5% acrylamide by weight of copolymer and having a solids content of 52.8% by weight of emulsion, prepared by the continuous polymerization process disclosed in U.S. Pat. 3,551,396 of R. Lanthier. To this emulsion was added 4.5 g. of 37% aqueous formaldehyde solution per 100 grams emulsion and sufficient saturated aqueous solution of sodium silicate to adjust the emulsion pH to 7.0. Cross-linking catalysts were then added to samples of the treated emulsion. In the polymer cross-linking tests shown in Table I, addition of indicated catalyst to the samples was made with adjustment of pH to 4–5 with the indicated acid. Film was then cast from the emulsion and dried either at ambient room temperature for a minimum of 4 days or at 140° C. for 2 minutes, prior to determination of amount of insoluble polymer by the "Solubility Test" previously described.

TABLE I

| Catalyst | Emulsion pH | Film curing temp., ° C. | Percent insoluble polymer in film |
|---|---|---|---|
| 0.1 g. alum plus p-toluene sulfonic acid (catalyst of prior art). | 4.0 | 23° C. (7 days) | 12 |
| $Zn(NO_3)_2$ (2% w./w. on solids) plus $HNO_3$ (catalyst of prior art). | 5.0 | 23° C. (4 days)<br>140° C. (2 mins.) | 14<br>91 |
| $NH_4$ sulfamate (0.04% w./w. on solids) plus sulfamic acid. | 5.0 | 23° C. (4 days)<br>140° C. (2 mins.) | 72<br>93 |
| $NH_4$ sulfamate (0.04% w./w. on solids) plus $HNO_3$. | 5.0 | 23° C. (4 days)<br>140° C. (2 mins.) | 61<br>95 |

It will be noted from Table I that promotion of cross-linking with the novel catalyst according to the present invention, as well as being highly effective on curing with heat, provides greatly improved cross-linking at pH 5 with ambient room temperature curing over that obtainable with the same copolymer but using catalysts of the prior art. These improved effects on room temperature curing appear to be specific to the use of, in conjunction with the water-soluble sulfamate salt, sulfamic acid or nitric acid for pH adjustment, hydrochloric acid or oxalic acid, for instance, being unsatisfactory for this purpose.

EXAMPLE 2

This example illustrates polymer cross-linking obtainable with the catalyst according to the present invention at pH 1.5. The procedure was as described in Example 1 and the results are given in Table II.

TABLE II

| Catalyst | Emulsion pH | Film curing temp., ° C. | Percent insoluble polymer in film |
|---|---|---|---|
| Sulfamic acid | 1.5 | 23° C. (7 days)<br>140° C. (2 mins.) | 92<br>96 |
| $NH_4$ sulfamate (0.04% w./w. on solids) plus sulfamic acid. | 1.5 | 23° C. (4 mins)<br>140° C. (2 mins) | 92<br>94 |
| $NH_4$ sulfamate (0.4% w./w. on solids) plus nitric acid). | 1.5 | 23° C. (4 days)<br>140° C. (2 mins.) | 13<br>96 |

It will be noted from Table II that cross-linking on ambient room temperature curing is comparable to that obtained on curing at 140° C.

EXAMPLE 3

This example illustrates cross-linking of a terpolymer system according to the present invention.

The emulsion used was a vinyl acetate/n-butyl acrylate/acrylamide terpolymer emulsion containing 7.5% acrylamide and 20% n-butyl acrylate by weight of terpolymer and having a solids content of 56.0% by weight of emulsion, prepared by the continuous polymerization process disclosed in U.S. Pat. 3,551,396 of R. Lanthier. To the emulsion was added 3% formaldehyde by weight of emulsion solids and sufficient saturated aqueous solution of sodium silicate to adjust the emulsion pH to 7.0. To a portion of the formaldehyde-treated emulsion was added 0.4% of ammonium sulfamate by weight of emulsion solids and then sulfamic acid to pH 5.0. Film cast from the emulsion and dried at ambient room temperature for 4 days was found to contain 39% insoluble polymer as determined by the Solubility Test; film cast from the emulsion and dried at 140° C. for 2 minutes contained 86% insoluble polymer. Determinations of cross-linking of the terpolymer using a prior art catalyst, i.e. p-toluene sulfonic acid, under similar conditions showed lower percentages of insoluble polymer in film.

It will be noted that the percent insoluble terpolymer obtained on ambient room temperature drying of film, as determined by the Solubility Test, is lower than that obtained with the same catalyst but using the copolymer emulsion of Example 1. This is perhaps due to the nature of the terpolymer itself, that is, it is less susceptible to swelling with water than the copolymer of Example 1.

EXAMPLE 4

This example illustrates cross-linking, according to the present invention, of systems including a cross-linking agent.

(A) The vinyl acetate/acrylamide copolymer emulsion of Example 1 was used but was *not* post-treated with formaldehyde. Instead, 28% by weight of total emulsion solids of tetramethylol acetylenediurea was added to the emulsion as cross-linking agent and the pH of the emulsion then adjusted to 1.5 with sulfamic acid. Film cast from the emulsion and dried for 4 days at ambient room temperature was found to contain 73% insoluble polymer by the Solubility Test.

(B) The vinyl acetate/acrylamide copolymer of Example 1 was used and treated with formaldehyde as described in Example 1. To the treated emulsion was then added 28% by weight of emulsion solids of tetramethylol acetylenediurea and the pH of the emulsion adjusted to 1.5 with sulfamic acid. Film cast from the emulsion and dried for 4 days at ambient room temperature contained 73% insoluble polymer as determined by the Solubility Test.

Numerous other modifications of the various expedients described can be made without departing from the scope of the invention which is defined in the following claims.

What is claimed is:

1. A process for preparing a cross-linked polymer film from an aqueous polymer emulsion containing a cross-linkable system incorporating N-methylolamide groups, the components of the system comprising the polymer which is a copolymer of acrylamide and a monomer of the group consisting of vinyl esters of monocarboxylic acids, alkyl esters of acrylic and methacrylic acids, vinyl chloride, ethylene, and mixtures thereof, said copolymer being film-forming at ambient room temperature and having at least some of the amide groups therein converted to N-methylolamide groups by addition of formaldehyde to the emulsion at pH 7, said system also containing optionally a cross-linking agent, the process comprising adding to the emulsion a water-soluble compound containing a sulfamate group as cross-linking catalyst, the emulsion being adjusted to acidic pH with a member of the group consisting of sulfamic acid and nitric acid, casting a film from the emulsion, and drying the film to a cured cross-linked polymer at ambient room temperature.

2. A process as claimed in claim 1 wherein the cross-linkable system consists essentially of the polymer.

3. A process as claimed in claim 2 wherein the polymer is a copolymer of vinyl acetate and acrylamide to which formaldehyde has been added at pH of about 7.

4. A process as claimed in claim 3 wherein the copolymer contains about 2–12% by weight of acrylamide and the amount of formaldehyde is sufficient to react with substantially all of the acrylamide groups at pH 7 to form N-methylolacrylamide groups.

5. A process as claimed in claim 1 wherein the cross-linkable system comprises a copolymer of vinyl acetate and acrylamide containing about 2–12% by weight of acrylamide and a cross-linking agent containing N-methylolamide groups.

6. A process as claimed in claim 5 wherein the cross-linking agent is tetramethylol acetylenediurea.

7. A process as claimed in claim 1 wherein the water-soluble compound is sulfamic acid and the pH of the emulsion is adjusted to about 1–2 therewith.

8. A process as claimed in claim 1 wherein the water-soluble compound is ammonium sulfamate.

9. A process as claimed in claim 8 wherein an amount of about 0.3% to 0.5% by weight of emulsion of ammonium sulfamate is added.

10. A process as claimed in claim 9 wherein the pH of the emulsion is adjusted to about 5 with sulfamic acid.

11. A process as claimed in claim 1 wherein the film is dried at ambient room temperature.

References Cited

UNITED STATES PATENTS

| | | | |
|---|---|---|---|
| 2,377,867 | 6/1945 | D'Alelio | 260—69 X |
| 2,680,110 | 6/1954 | Loughran et al. | 260—72 X |
| 2,940,944 | 6/1960 | Christenson | 260—72 X |
| 3,037,963 | 6/1962 | Christenson | 260—72 |
| 3,287,318 | 11/1966 | Glover et al. | 260—72 |
| 3,535,183 | 10/1970 | Marriott et al. | 260—72 X |
| 3,551,396 | 12/1970 | Lanthier | 260—85.7 |

OTHER REFERENCES

Chem. Abstracts, vol. 68, 1968, 115799 p., Haskell et al.
Chem. Abstracts, vol. 71, 1969, 125257 M, Renner.

HOWARD E. SCHAIN, Primary Examiner

U.S. Cl. X.R.

260—29.4 UA, 72 R, 853, 854

UNITED STATES PATENT OFFICE
CERTIFICATE OF CORRECTION

Patent No. 3,775,512  Dated 27 November 1973

Inventor(s) Raymond Lanthier,

It is certified that error appears in the above-identified patent and that said Letters Patent are hereby corrected as shown below:

Column 4, lines 50-55, in the data in Table II, change

"0.04%" to --0.4%--

"4 mins" to --4 days--

"13" to --83--

Signed and sealed this 23rd day of April 1974.

(SEAL)
Attest:

EDWARD M.FLETCHER,JR.  C. MARSHALL DANN
Attesting Officer  Commissioner of Patents